US005801898A

United States Patent [19]

Okuie et al.

[11] Patent Number: 5,801,898
[45] Date of Patent: Sep. 1, 1998

[54] LOADING MECHANISM OF MAGNETIC RECORDING-REPRODUCTION APPARATUS AND METHOD OF ASSEMBLING THE MECHANISM

[75] Inventors: Takahiro Okuie, Nara; Osamu Takao, Kobe; Haruhiko Yoneda, Daito, all of Japan

[73] Assignee: Sanyo Electric Co., Ltd., Moriguchi, Japan

[21] Appl. No.: 624,798

[22] Filed: Mar. 27, 1996

[30] Foreign Application Priority Data

| Apr. 10, 1995 | [JP] | Japan | 7-083566 |
| Apr. 11, 1995 | [JP] | Japan | 7-085023 |
| Apr. 12, 1995 | [JP] | Japan | 7-086586 |

[51] Int. Cl.⁶ .......................... G11B 15/665; G11B 15/61
[52] U.S. Cl. ........................................ 360/85; 360/95
[58] Field of Search .................................. 360/84, 85, 95

[56] References Cited

U.S. PATENT DOCUMENTS

| 4,562,496 | 12/1985 | Saito et al. ............... 360/85 |
| 4,951,164 | 8/1990 | Yasaka et al. ............ 360/85 |
| 5,077,624 | 12/1991 | Nakanishi ................. 360/85 |
| 5,349,485 | 9/1994 | Lin et al. .................. 360/85 |
| 5,475,546 | 12/1995 | Choi ......................... 360/85 |
| 5,583,714 | 12/1996 | Nawa et al. ............... 360/85 |

FOREIGN PATENT DOCUMENTS

| 0 376 242 A2 | 7/1990 | European Pat. Off. . |
| 0 376 242 A3 | 7/1990 | European Pat. Off. . |
| 0 632 440 A2 | 1/1995 | European Pat. Off. . |
| 60-187564 | 9/1985 | Japan . |

Primary Examiner—Stuart S. Levy
Assistant Examiner—David L. Ometz
Attorney, Agent, or Firm—Armstrong, Westerman, Hattori, McLeland, & Naughton

[57] ABSTRACT

A chassis is provided with a pair of leading guide blocks slidably fitted in respective guide slots for withdrawing a tape from a cassette, loading links for slidingly moving the respective guide blocks, and catchers arranged on the chassis at a loading completed position for the respective guide blocks to come into pressing contact with. Each of the loading links comprises a pivotal lever rotatably fitting around a pivot on the chassis and a link plate connected by a pivot pin to a free end of the pivotal lever and rotatably engaged at a forward end thereof with the guide block. The chassis is formed with apertures permitting insertion of the respective guide blocks therein, each covered with the catcher and each communicating with the guide slot. The aperture is positioned at a greater distance from the pivot than the forward end of the link plate when a center line L1 connecting the pivot and the pivot pin and a center line L2 connecting the pivot pin and the portion of connection between the guide block and the link plate extend toward the direction of loading in alignment with each other.

7 Claims, 19 Drawing Sheets

FIG. 31 PRIOR ART
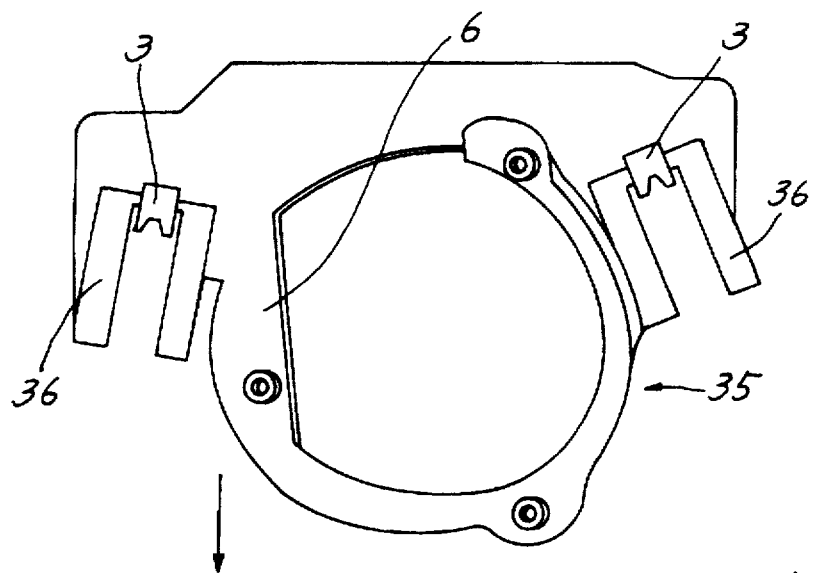
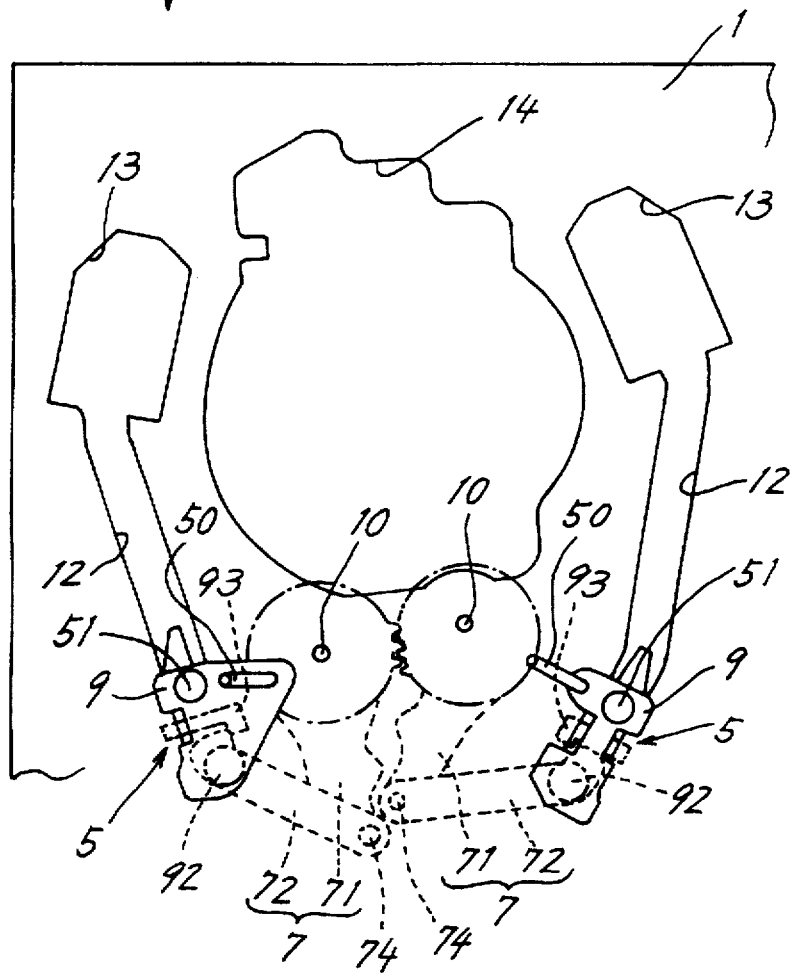

LOADING MECHANISM OF MAGNETIC RECORDING-REPRODUCTION APPARATUS AND METHOD OF ASSEMBLING THE MECHANISM

FIELD OF THE INVENTION

The present invention relates to recording-reproduction apparatus for recording and reproducing signals with use of magnetic tapes, and more particularly to a loading mechanism and a method of assembling the mechanism.

BACKGROUND OF THE INVENTION

U.S. Pat. No. 4,951,164 discloses a recording-reproduction apparatus (FIG. 31) already proposed by the present applicant and including a rotary cylinder for recording and reproducing signals with use of magnetic tapes. Since the invention is an improvement over this conventional apparatus, the conventional apparatus will be described first generally. In the following description, the tape loading direction will be referred to as the "front," and the unloading direction as the "rear."

With reference to FIG. 31, a chassis 1 is formed with an opening 14 at a position where a rotary cylinder (not shown) is to be mounted on the chassis. At opposite sides of the opening 14, the chassis 1 has a pair of guide slots 12, 12 extending toward a loading wait position. A leading guide block 5 is slidably fitted in each guide slot 12 for withdrawing a magnetic tape from a cassette (not shown). The end of the guide slot 12 toward the loading direction is enlarged to provide an aperture 13 for placing the guide block 5 in when the magnetic recording-reproduction apparatus is assembled. The leading guide block 5 has a guide roller 51 and an inclined pin 50 on a support plate 9 of synthetic resin, and a boss 92 projecting downward from a rear end portion thereof as is already known.

The guide block 5 is driven by a loading link 7 provided on the rear side of the chassis 1. The link 7 comprises a pivotal lever 71 fitting to a pivot 10 projecting from the rear side of the chassis 1, and a link plate 72 pivoted to the forward end of the pivotal lever 71 and having a free end fitting to the boss 92.

The opening 14 and the apertures 13 are covered with a cylinder base 35 supporting the rotary cylinder. Joined to the cylinder base 35 are catchers 3, 3 with which the guide blocks 5, 5 come into pressing contact respectively, a mount 6 for placing the rotary cylinder thereon, and rail arms 36 fitting in the apertures 13 and extending into the guide solts 12. The mount 6 is placed over the opening 14, and the catcher 3 and rail arms 36 over each aperture 13. The catcher 3 is positioned at the front end of the aperture 13.

Before the loading link 7 is attached to the pivot 10 and the guide block 5, the guide block 5 is fitted in the aperture 13 first; and temporarily returned to the loading wait position along the guide slot 12. The guide block 5 has on its bottom side a support lug 93 for supporting the forward end of the link plate 72 as will be described later.

Next as shown in FIG. 32, the chassis 1 is turned upside down, and a jig 37 is placed over the apertures 13. The jig 37 has auxiliary guide slots 38 continuous with the respective guide slots 12. After the jig 37 is mounted, the guide block 5 is advanced again into contact with the portion of the jig 37 which defines the front end of the auxiliary guide slot 38 as shown in FIG. 33.

After the loading link 7 is so rotated that the pivotal lever 71 is approximately aligned with the link plate 72, the forward end of the link plate 72 is fitted to the guide block 5 and the base end of the pivotal lever 71 to the pivot 10. The link plate 72 is attached to the block 5 without being interfered with the support lug 93. In attaching the loading link 7 to the guide block 5, the block 5 will slip off the apertured portion 13 unless the jig 37 is used, so that the jig 37 is indispensable to this procedure.

The guide block 5 is thereafter returned to the loading wait position by rotating the loading link 7 (see FIG. 31). With the forward end of the link plate 72 inserted between the support lug 93 and the chassis 1, the loading link 7 is prevented from being disengaged from the guide block 5 when subjected to vibrations from outside. Subsequently, the jig 37 is removed from the chassis 1, and the cylinder base 35 is mounted on the chassis 1.

With the completion of loading, each leading guide block 5 comes into pressing contact with a notched portion of the catcher 3, and the boss 92 is pressed against the side face of the rail arm 36 by the leading link 7 as seen in FIG. 34. This prevents the guide block 5 from rotatingly deflecting about the portion of the block 5 in contact with the catcher 3, within a plane parallel to the chassis 1. Further as shown in FIG. 35, the rotary cylinder 2 is positioned in place by pins 39, 39 projecting from the upper surface of the cylinder base 35 and fitting in the cylinder.

However, the recording-reproduction apparatus described has the following problems.

1. The use of the jig 37 for attaching the loading link 7 to the guide block 5 requires labor, hence a low work efficiency. When the jig 37 is removed after the guide block 5 has been mounted on the chassis 1, the loading link 7 will rotate during the transport of the chassis 1, rendering the guide block 5 likely to slip off the apertured portion 13.

2. Since the guide block 5 is formed of synthetic resin, the boss 92 on the support plate 9 is susceptible to wear due to the sliding contact thereof with the slotted chassis portion 12 during loading. Consequently, upon the boss 92 coming into pressing contact with the side face of the rail arm 36 in the loading completed position, the guide block 5 is likely to rotatingly deflect from the normal position within a plane parallel to the chassis 1, failing to assure accurate travel of the tape.

3. The portion of the loading link 7 fitting to the boss 92 is usually provided by a tubular socket 70 facing upward and formed by subjecting the link 7 to drawing work as seen in FIG. 3. However, upward deflection of the link 7 during loading permits contact of the top end face of the socket 70 with the bottom face of the boss 92 to gall the boss 92, imposing a burden on the loading movement and entailing a likelihood of hampering smooth loading.

The present applicant previously proposed to make the mount 6 integral with the chassis 1 by drawing the chassis 1 (see FIG. 18 and Published Japanese Utility Model Registration SHO 64-2319). In this case, there is a need to provide the catchers 3 on the chassis 1 separately from the mount 6. However, if the mount 6 is formed by drawing, the chassis portion around the mount 6 is liable to deform, so that there arises a need to provide a large spacing between the mount 6 and each aperture 13 to preclude deformation of the aperture 13.

The present applicant has embodied the idea of altering the position of the aperture 13 and assembling the leading guide block 5 and the loading link 7 with an improved work efficiency.

SUMMARY OF THE INVENTION

An object of the present invention is to provide a loading mechanism comprising a leading guide block and a loading link which can be assembled without using any jig, with the likelihood eliminated of the guide block slipping off the chassis during transport.

Another object of the invention is to preclude wear due to the sliding contact of the guide block with the guide slot portion of the chassis and to diminish the rotational deflection of the guide block about the portion of catcher which contacts the guide block.

Another object of the invention is to ensure smooth loading by preventing the top end face of the tubular socket from galling the boss owing to upward deflection of the loading link.

Still another object of the invention is to permit the tape to travel with good stability by reinforcing the catcher for the leading guide block to be pressed against and thereby holding the guide block tilted in a definite state.

According to the present invention, the forward end of a link plate is positioned under a guide slot when a center line L1 connecting a pivot and a pivot pin connecting the link plate to a pivotal lever and a center line L2 connecting the pivot pin and the portion of connection between a leading guide block and the link plate extend toward the direction of loading in alignment with each other. An aperture into which the guide block is inserted is formed at a position a greater distance away from the pivot than the forward end of the link plate. The portion of a catcher to be contacted by the guide block is located closer to a loading wait position than the aperture.

The loading link is attached to the leading guide block, as inserted in the aperture, slightly retracted toward the loading wait position. However, once the guide block and the loading link are assembled, there is no likelihood of the guide block slipping off the apertured portion of the chassis. The loading link can therefore be attached to the guide block without using any jig, hence an improved work efficiency.

Further even if the loading link as attached to the guide block is rotated inadvertently, the guide block will not slip off from the chassis.

The guide block has an abutting face, which comes into contact with a positioning protrusion on the chassis, whereby the guide block is restrained from rotatingly deflecting about the portion of the catcher in contact with the guide block, within a plane parallel to the chassis. Thus, the portions which exert no influence on sliding friction are brought into contact with each other to position the guide block in place, whereby the guide block is held in position against rotational deflection to assure a stabilized travel for the tape.

The loading link is restrained from deflecting upward by a projection extending from the leading guide block. Although the loading link, if deflecting upward, would gall the top end face of a boss, the projection obviates this drawback, ensuring smooth loading. Since the projection is provided to he positioned approximately in the center of the guide slot, the projection is unlikely to come into contact with the edge of the chassis defining the slot to cause galling during the sliding movement of the guide block.

The catcher has a pair of prop arms, which are interconnected by a reinforcing bar and are therefore diminished in deflective deformation even if subjected to the pressure of the leading guide block.

BRIEF DESCRIPTION OF THE DRAWINGS

FIG. 31 is a plan view showing a cylinder base and chassis of the prior art;

DETAILED DESCRIPTION OF PREFERRED EMBODIMENT

Figure 1:
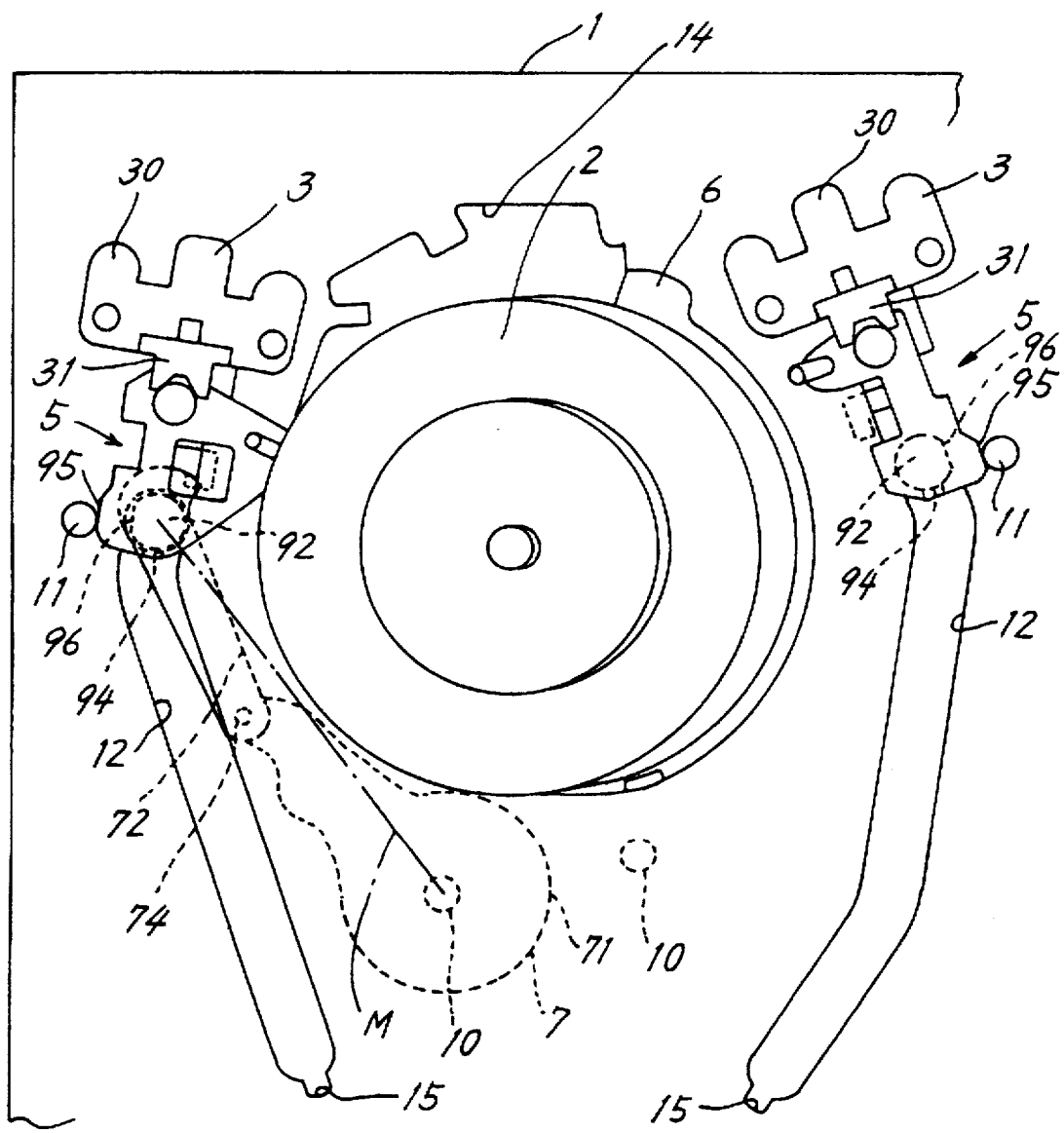
FIG. 1 is a plan view showing a chassis with a rotary cylinder mounted thereon.

A recording-reproduction apparatus embodying the invention will be described below. Throughout the drawings, like parts are designated by like reference numerals, and the same construction as in the conventional apparatus will not be described repeatedly.

Broad Description of the Entire Apparatus

Figure 2:
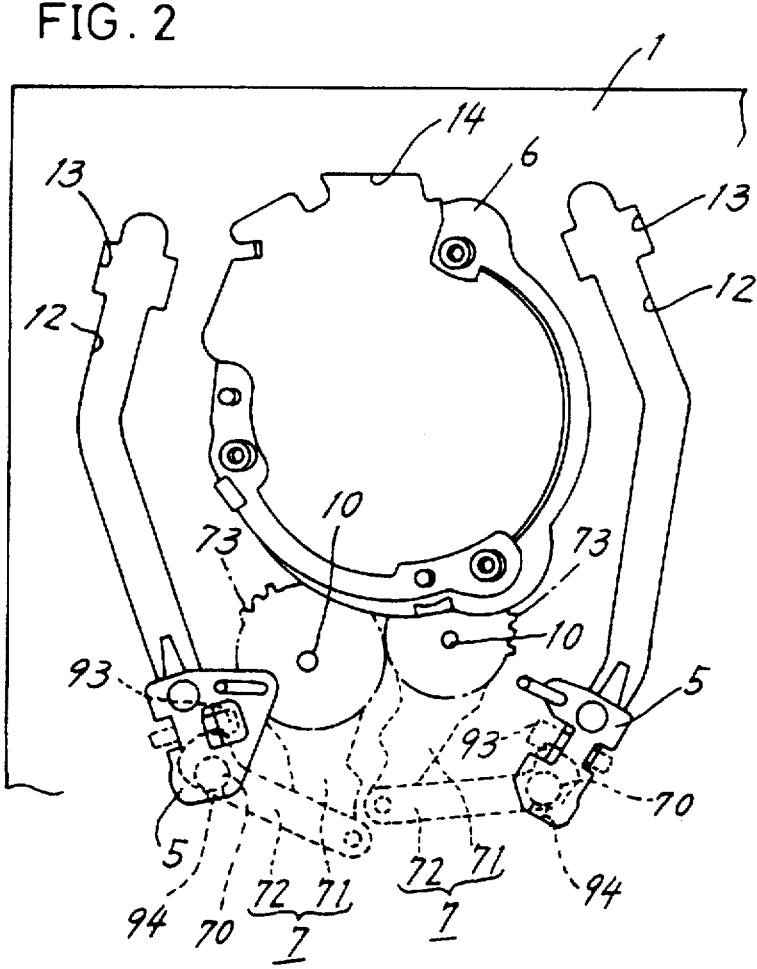
FIG. 2 is a plan view showing the chassis ready for loading.

FIG. 1 is a plan view of a chassis 1 with a tape (not shown) completely loaded in place, and FIG. 2 is a plan view of the chassis 1 with a rotary cylinder 2 omitted. A mount 6 on the chassis 1 carries thereon the rotary cylinder 2 for recording and reproducing signals. At each of opposite sides of the cylinder 2, a catcher 3 with which a leading guide block 5 comes into pressing contact is provided separately from the mount 6 in a loading completed position above a guide slot 12.

The mount 6 is formed by drawing the chassis 1. The end of the guide slot 12 closer to the mount 6 is enlarged to provide an aperture 13, in which the catcher 3 is fitted from above. The aperture 13 is positioned toward the direction of loading beyond the loading completed position of the guide block 5.

Provided upright on the rear side of the chassis 1 and positioned toward the direction of unloading from the mount 6 is a pivot 10 serving as the center of rotation of a loading link 7 for driving the guide block 5. The link 7 at the right is not shown in FIG. 1.

The loading link 7, like the conventional one, comprises a pivotal lever 71 fitting around the pivot 10 and a link plate 72 supported by a pivot pin 74 on the forward end of the lever 71. A tubular socket 70 fittable to the guide block 5 is formed by drawing at a free end of the link plate 72 and directed upward (see FIG. 3). A loading gear 73 coupled to the pivotal lever 71 is fitted around the pivot 10 coaxially with the lever 71.

The loading gears 73, 73 for the respective loading links 7, 7 are in mesh with each other. A rack mechanism (not shown) is in mesh with one of the gears 73 to drivingly rotate the two loading links 7, 7. Although not shown, a spring is connected between the loading gear 73 and the loading link 7 for pressing the leading guide block 5.

Figure 3:
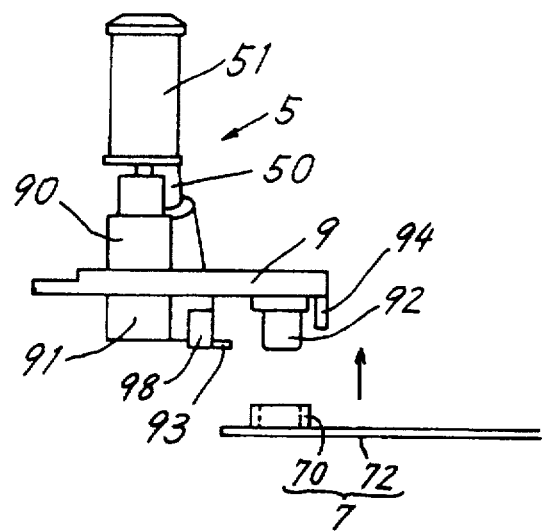
FIG. 3 is a side elevation showing a leading guide block and a loading link.
Figure 14:
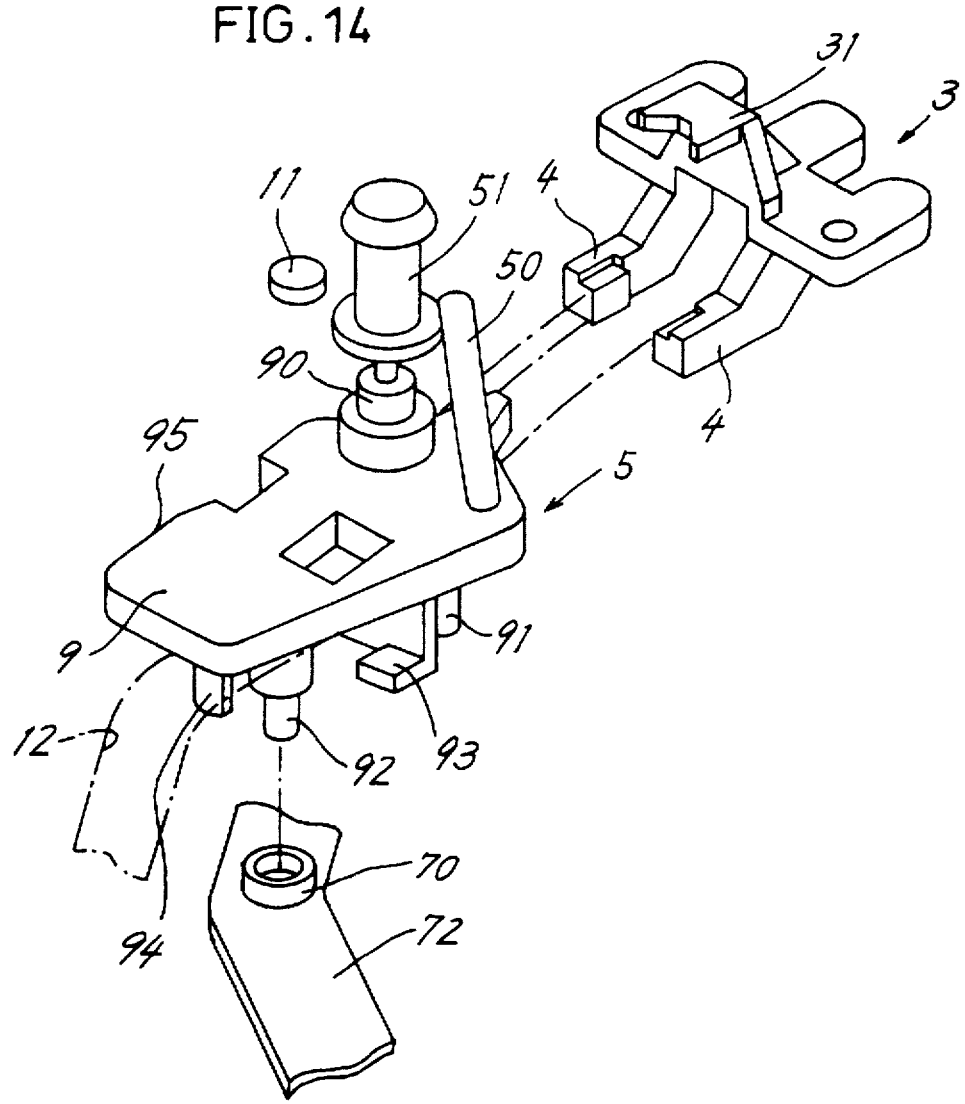
FIG. 14 is a perspective view showing the guide block immediately before it is pressed into contact with the catcher.

The guide block 5 has a support plate 9 molded from PPS (polyphenylene sulfide) resin. As shown in FIGS. 3 and 14, a guide roller 51 is rotatably mounted on a first shaft 90 extending upright from the support plate 9. Projecting from the bottom side of the plate 9 is a second shaft 91 coaxial with the first shaft 90. A boss 92 projecting from the bottom of the support plate 9 at one end thereof remote from the shaft 91 is fitted to the tubular socket 70 of the link plate 72 as in the prior art.

Extending downward from the rear end of the support plate 9 is a projection 94 positioned in corresponding relation approximately to the center of width of the guide slot 12. As will be described later, the projection 94 bears on the upper surface of the link plate 72 to prevent upward deflection of the plate 72.

Figure 4:
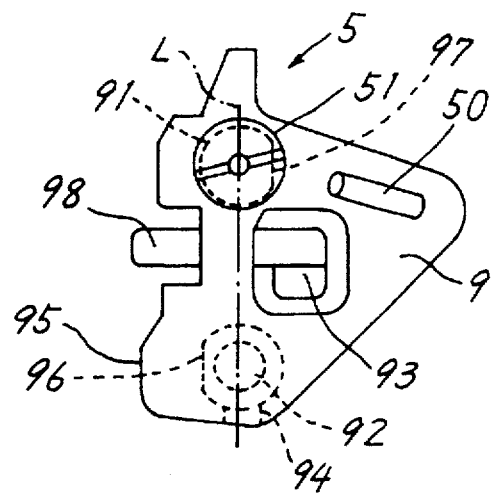
FIG. 4 is a plan view of the guide block.

With reference to FIG. 4, a cutout 96 is formed in the periphery of the boss 92 to form a clearance between the boss 92 and the chassis edge defining the guide slot 12 when the guide block 5 comes into pressing contact with the catcher 3. The second shaft 91 also has a cutout portion 97 in its periphery at one side of a center line L connecting the boss 92 and the second shaft 91 opposite to the other side thereof where the cutout 96 is formed in the boss 92. The cutout portion 97 prevents the second shaft 91 from contacting the slot-defining edge facing this portion.

Disposed between the boss 92 and the second shaft 91 is a retainer 98 in contact with the rear surface of the chassis 1 and extending across the center line L at right angles therewith. The lower end portion of the retainer 98 at its right side extends toward the boss 92, providing a support lug 93 for supporting the forward end of the link plate 72 of the loading link 7. The side face of the support plate 9 at the left of the boss 92 provides an abutting face 95 approximately parallel to the center line L. While FIG. 4 shows the left leading guide block 5, the right guide block 5 is in opposite relation to the left guide block 5 in the respective positions of the abutting face 95 and the cutout portion 97 with respect to the center line L.

As will be described later, a positioning protrusion 11 projects upward from the chassis 1 in the vicinity of the loading completed position and at a position corresponding to the abutting face 95. The chassis 1 has a recess 15 at the rear end of the guide slot 12 for the projection 94 to fit in while waiting for loading (see FIG. 1).

Figure 5:
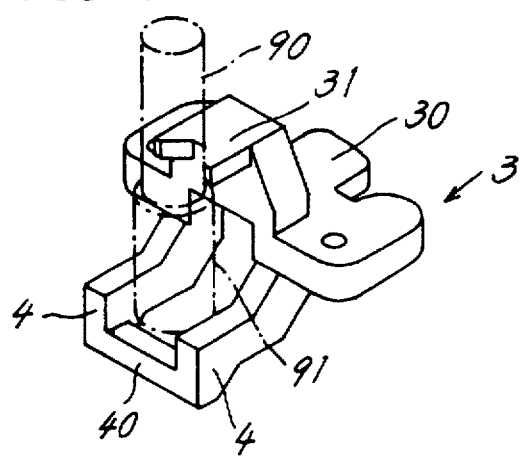
FIG. 5 is a perspective view of a catcher.
Figure 6:
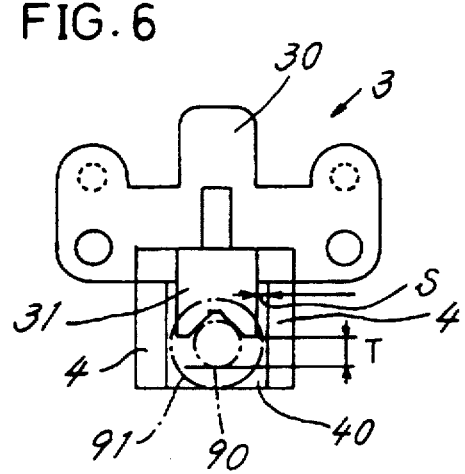
FIG. 6 is a plan view of the catcher.

As shown in FIGS. 5 and 6, the catcher 3 comprises a base 30 resting on the chassis 1 and a holder 31 on the base 30. The guide block 5 comes into contact with the holder 31. A pair of prop arms 4, 4 extends from the bottom side of the base 30 through the aperture 13 and is positioned under the chassis 1. The prop arms 4, 4 are parallel to each other and extend in the direction of unloading. The second shaft 91 of the guide block 5 fits in between the arms 4, 4. The prop arms 4, 4 are interconnected by a reinforcing bar 40 at their rear-end lower portions. The rigid frame thus formed diminishes deflective deformation of the arms 4, 4 even if they are subjected to a lateral load. When seen from above, each side face of the holder 31 is spaced apart from the inner surface of the prop arm 4 at the same side by a clearance S, and the rear end of the holder 31 is spaced apart from the reinforcing bar 40 by a clearance T.

Mounting Leading Guide Block

Figure 7:
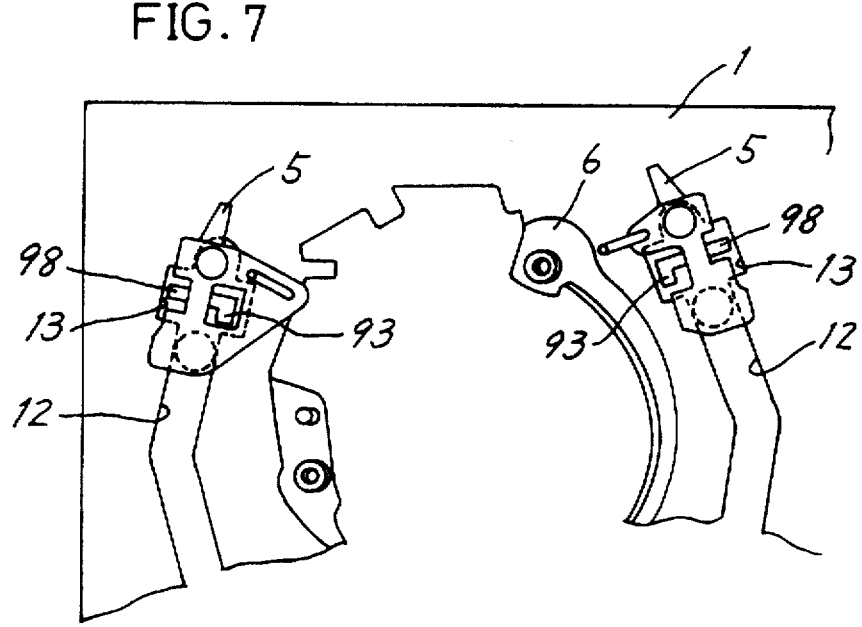
FIG. 7 is a plan view showing the guide blocks as fitted in the chassis.

To mount the guide block 5 on the chassis 1, the guide block 5 is inserted into the aperture 13 with the retainer 98 positioned properly for the aperture as shown in FIG. 7. The bottom side of the support plate 9 is placed on the upper surface of the chassis 1, and the upper face of the retainer 98 is caused to contact the lower surface of the chassis 1. The guide block 5 is thereafter temporarily drawn into the guide slot 12 therealong slightly. With the retainer 98 in contact with the rear surface c)f the chassis 1, the guide block 5 will not slip off from the chassis 1.

Figure 8:
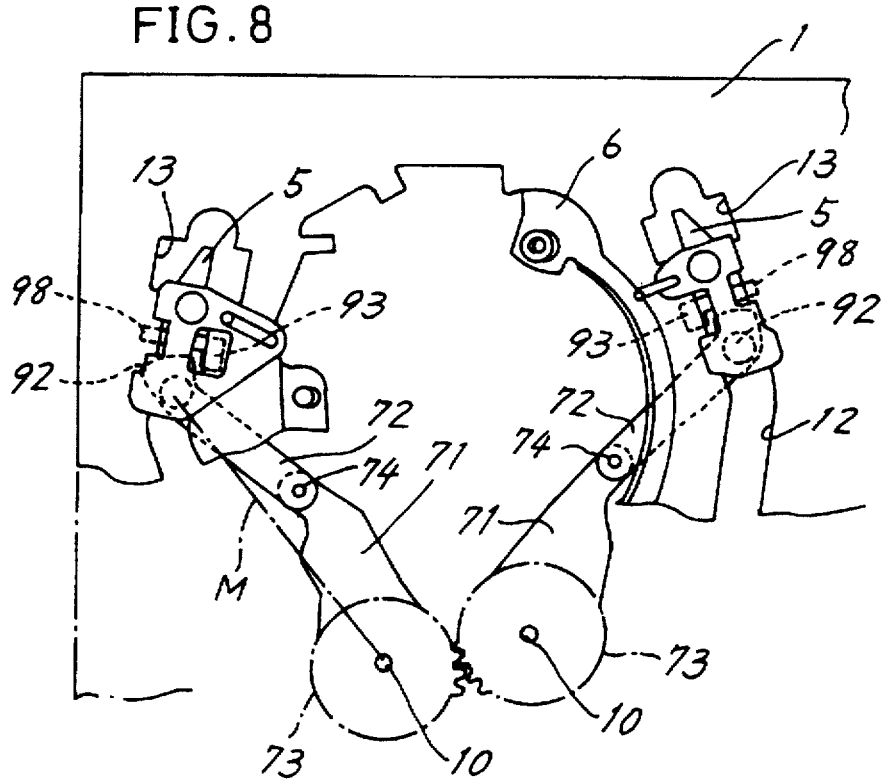
FIG. 8 is a plan view showing the loading link as attached to the guide block.

Next as seen in FIG. 8, the link plate 72 of the loading link 7 is attached to the boss 92, and the pivotal lever 71 thereof to the pivot 10, with the link plate 72 and the lever 71 flexed reversely on the pivot pin 74, i.e., with the pivot pin 74 positioned inwardly of a phantom line M connecting the pivot 10 and the boss 92. The forward end of the link plate 72 is fittable to the boss 92 without being interfered with by the support lug 93. The loading gears 73, 73 fit around the respective pivots 10, 10 while meshing with each other.

Figure 9:
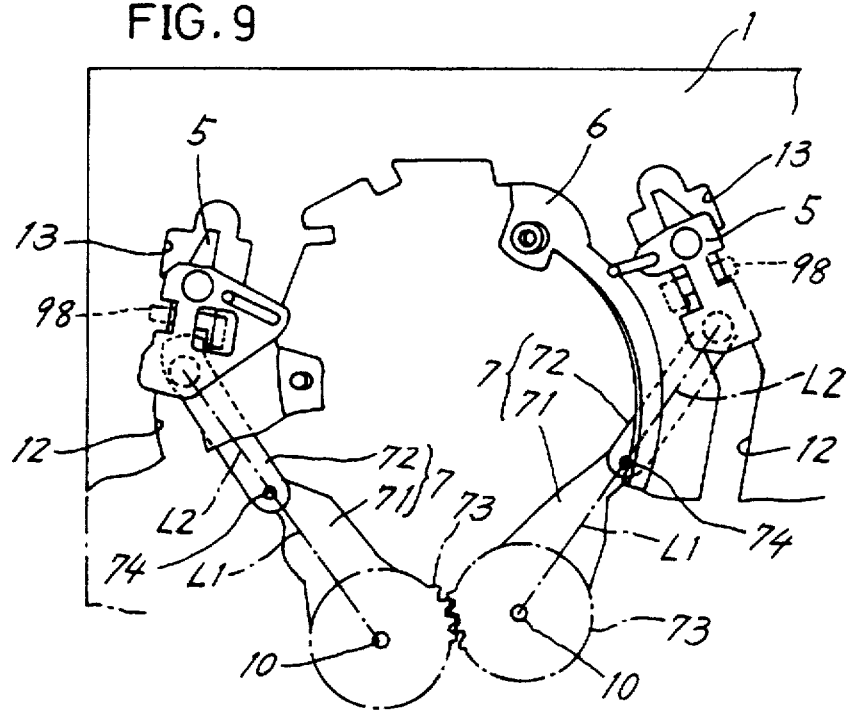
FIG. 9 is a plan view showing the loading link as attached to the guide block.

Next as shown in FIG. 9, the pivotal lever 71 is rotated slightly so that a center line L1 connecting the pivot 10 and the pivot pin 74 and a center line L2 connecting the pivot pin 74 and the portion of connection between the guide block 5 and the link plate 72 extend toward the loading direction in alignment with each other. In this state, the aperture 13 is positioned at a greater distance from the pivot 10 than the portion of connection. Although the guide block 5 slidingly moves a small distance toward the loading direction, the retainer 98 does not reach the aperture 13, and the block 5 will not slip off from the chassis 1.

Figure 10:
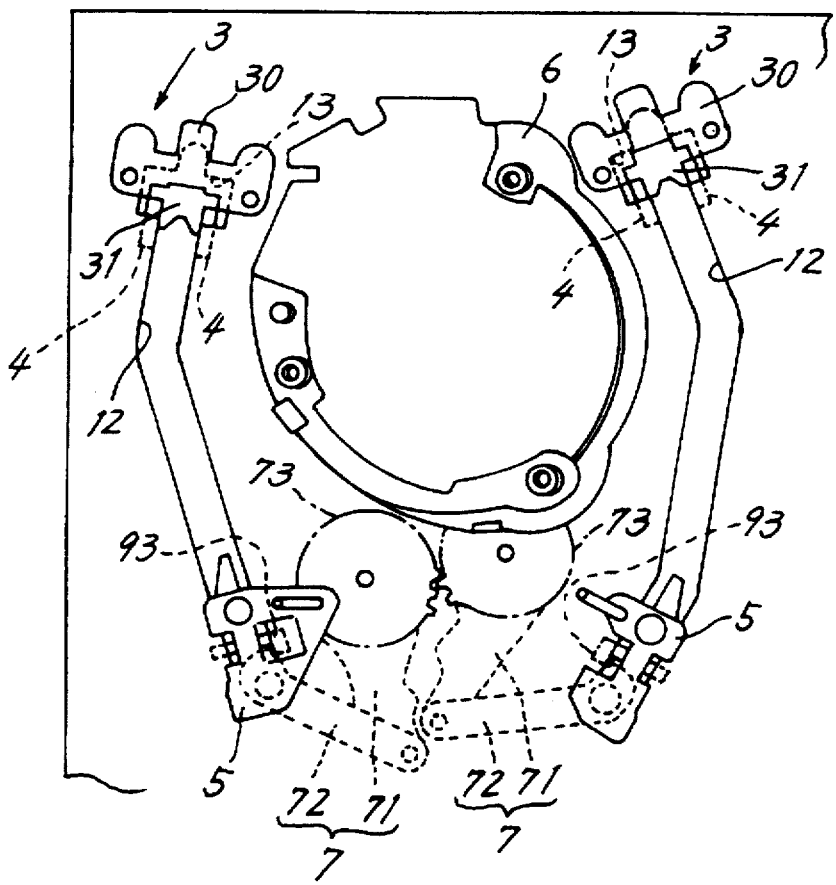
FIG. 10 is a plan view showing the guide block in a wait position.

The pivotal lever 71 is further rotated to retract the guide block 5 to the loading wait position as seen in FIG. 10. The forward end of the link plate 72 rests on the support lug 93, whereby the loading link 7 is prevented from slipping off from the guide block 5.

Finally, the prop arms 4, 4 of the catcher 3 is inserted through the aperture 13 in the chassis 1, and the base 30 is fitted over the aperture 13 and thereafter fastened to the chassis 1 with screws.

In the assembling procedure described, the leading guide block 5 is unable to move to the aperture 13 after the loading link 7 has been attached to the block 5, so that there is no likelihood of the guide block 5 slipping off from the chassis 1. The loading link 7 can therefore be attached to the guide block 5 without using any jig unlike the conventional link, hence an improved work efficiency.

Further after the loading link 7 has been attached to the guide block 5, the block 5 is unlikely to slip off from the chassis 1 even if the link 7 is rotated. This renders the chassis 1 transportable with an improved efficiency.

With the catcher 3 mounted on the chassis 1, the holder 31 on the catcher 3 is positioned closer to the loading wait position than the aperture 13. For loading the magnetic tape, the rotation of the loading gear 73 causes the loading link 7 to advance the block 5 toward the catcher 3 with the tape pulled out by the block as previously described.

On completion of loading, the pivot pin 74 is positioned outwardly of the phantom line M as shown in FIG. 1. The pressure of the loading link 7 is transmitted to the guide block 5 without the likelihood of the link plate 72 becoming aligned with the pivotal lever 71.

Leading Guide Block as Held in Position

Figure 11:
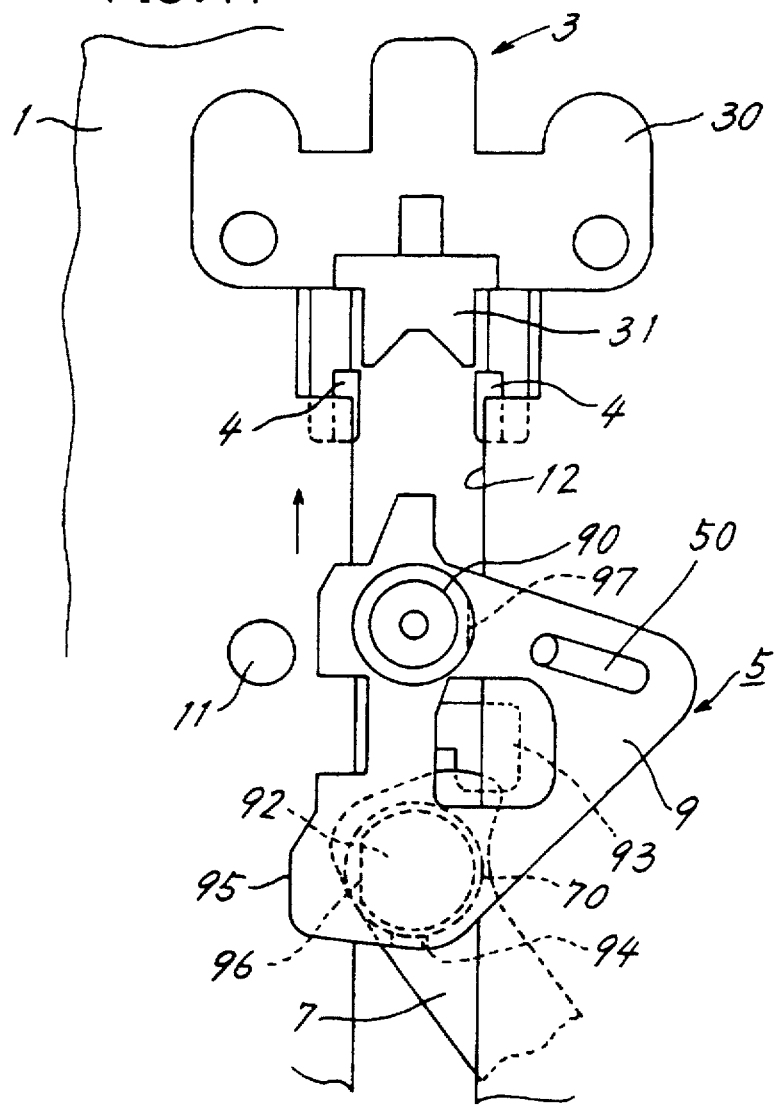
FIG. 11 is a plan view showing the guide block immediately before it is pressed into contact with the catcher.
Figure 12:
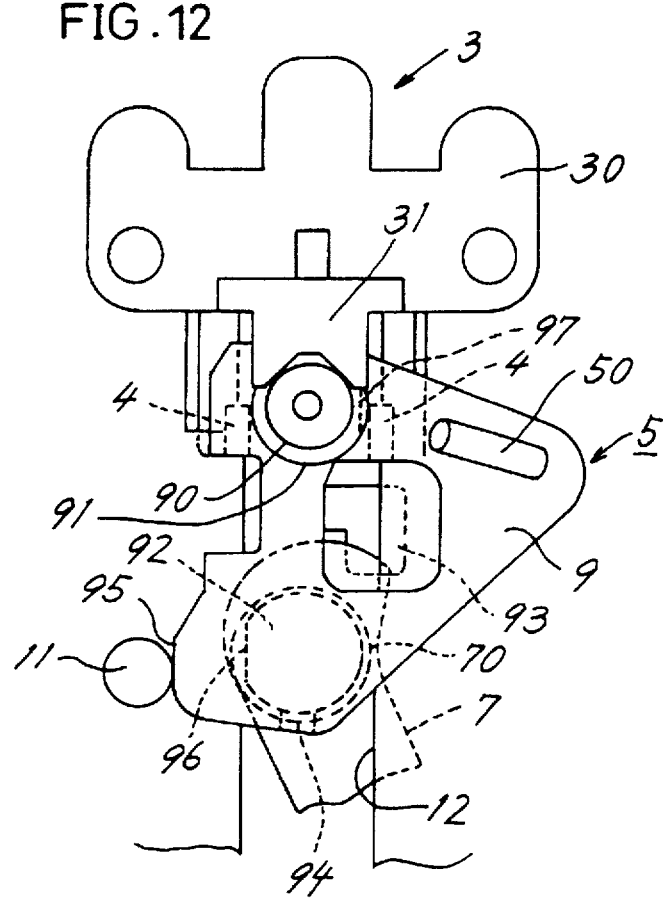
FIG. 12 is a plan view showing the guide block in pressing contact with the catcher.
Figure 13:
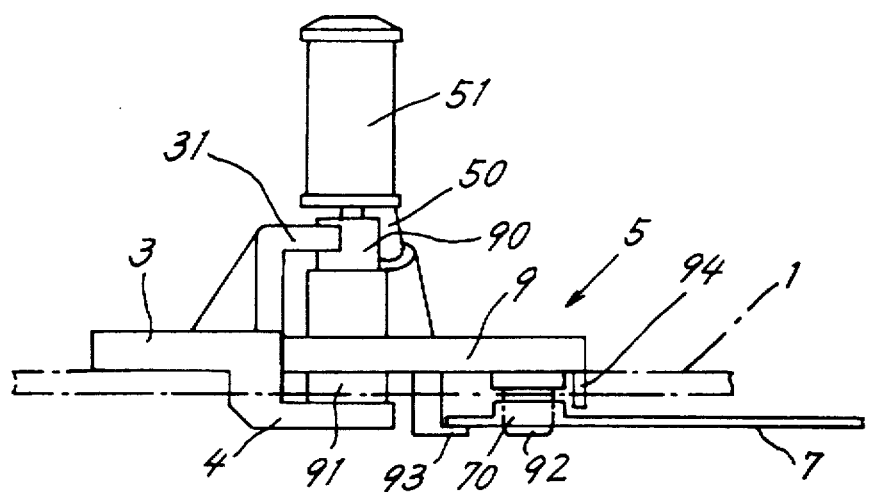
FIG. 13 is a side elevation of the same.

Upon completion of loading, the first shaft 90 of the guide block 5 comes into pressing contact with the holder 31 of the catcher 3. FIGS. 11 and 14 are respectively a plan view and a perspective view showing the left leading guide block 5 immediately before coming into pressing contact with the catcher 3, FIG. 12 is a plan view showing the guide block in pressing contact with the catcher, and FIG. 13 is a side elevation of the same.

The guide block 5 is biased outward by the loading link 7. The second shaft 91 is pressed against the inner face of the left prop arm 4, and the abutting face 95 bears on the positioning protrusion 11. Since the cutout 96 is formed in the boss 92, the left edge of the chassis defining the guide slot 12 will not contact the boss 92, ensuring abutting contact of the face 95 with the positioning protrusion.

The pressing contact of the second shaft 91 with the prop arm 4 restrains the guide block 5 from rotatingly deflecting within a plane orthogonal to the loading direction. Further because the abutting face 95 bears on the positioning protrusion 11, the guide block 5 is restrained from rotatingly deflecting about the portion of contact between the holder 31 and the first shaft 90, within a plane parallel to the chassis 1.

In view of the stabilization of travel of the tape, the opposite leading guide blocks 5, 5, when in pressing contact with the respective catchers 3, 3, are generally made slightly different from each other in inclination within a plane orthogonal to the loading direction. Accordingly, the opposite catchers 3, 3 are slightly different from each other in the size and shape of the prop arms 4, 4. However, according to the present embodiment wherein the cutout portion 97 is formed in the second shaft 91, the same catchers 3, 3 are usable for the following reason.

The right and left guide blocks 5 are opposite with respect to the direction in which the link 7 is biased and are therefore opposite with respect to the prop arm 4 to be contacted by the second shaft 91. Since the second shaft 91 has the cutout portion 97, each guide block 5, when coming into pressing contact with the catcher 3, has a clearance formed between the shaft and the prop arm 4 which is out of contact therewith. The prop arm 4 out of contact with the second shaft 91 exerts no influence on the inclination of the guide block 5. Accordingly, the same right and left catchers 3 are usable if the other prop arm 4 to be contacted by the second shaft 91 is provided in corresponding relation with the inclination of the guide block 5.

Further because the projection 94 restrains the loading link 7 from deflecting upward, the projection prevents the top end of the tubular socket 70 of the link 7 from galling the bottom of the boss 92, ensuring smooth loading. The projection 94 extends from the rear end of the guide block 5 and is positioned in corresponding relation to the approximate center of width of the guide slot 12, so that there is no likelihood of the projection 94 contacting the slotted portion of the chassis.

Since the chassis 1 is formed generally by blanking a metal sheet, burrs are often produced on the edges defining the guide slots 12. The support plate 9 of the guide block 5 is made from synthetic resin, so that the block 5 is liable to malfunction, for example, owing to galling if the projection 94 and such burrs contact the support plate. To preclude the projection 94 from contacting the slot-defining edge, therefore, the projection 94 is so positioned as stated above.

Mount

According to the present embodiment, the mount 6 for the rotary cylinder 2 is formed integrally with the chassis 1 by drawing the chassis 1. Stated more specifically with reference to FIG. 15, the inner peripheral portion of the chassis 1 defining an opening 14 is drawn to form a reinforcing wall 60 extending upward from the plane of the chassis 1, and an upper end portion of the wall 60 is further bent inward toward the opening 14 to form an inclined portion 61 which is to be opposed to the bottom of the rotary cylinder 2. The reinforcing wall 60 and the inclined portion 61 provide the mount 6.

Projecting upward from the inclined portion 61 are three lugs 62, 62, 62 for placing the bottom of the cylinder 2 thereon. A positioning projection 64 is formed at one side of each of the two lugs 62, 62 by drawing the inclined portion 61. The positioning projections 64 fit in the bottom of the cylinder 2, whereby the position of the cylinder 2 is determined relative to the mount 6 (see FIG. 16). The projections 64 are two in number because the position of the rotary cylinder 2 relative to the mount 6 can be determined by the two projections, whereas the projections 64 are not limited to two in number.

First and second relief holes 17, 18 are formed in the reinforcing wall 60 in the vicinity of the two lugs 62, 62, respectively. The second relief hole 18 extends over both wall 60 and chassis 1, while the first relief hole 17 extends from the boundary between the wall 60 and the plane of chassis 1 toward the wall 60. In the vicinity of the first relief hole 17, the chassis 1 has a crimp hole 16 for providing the right pivot 10 vertically.

Figure 17:
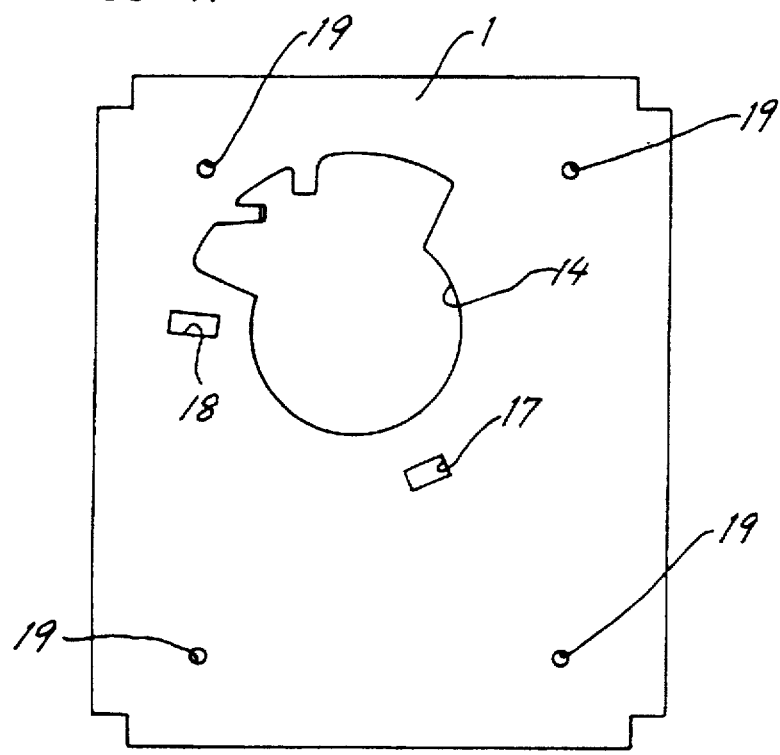
FIG. 17 is a plan view showing a machining step for the chassis.
Figure 18:
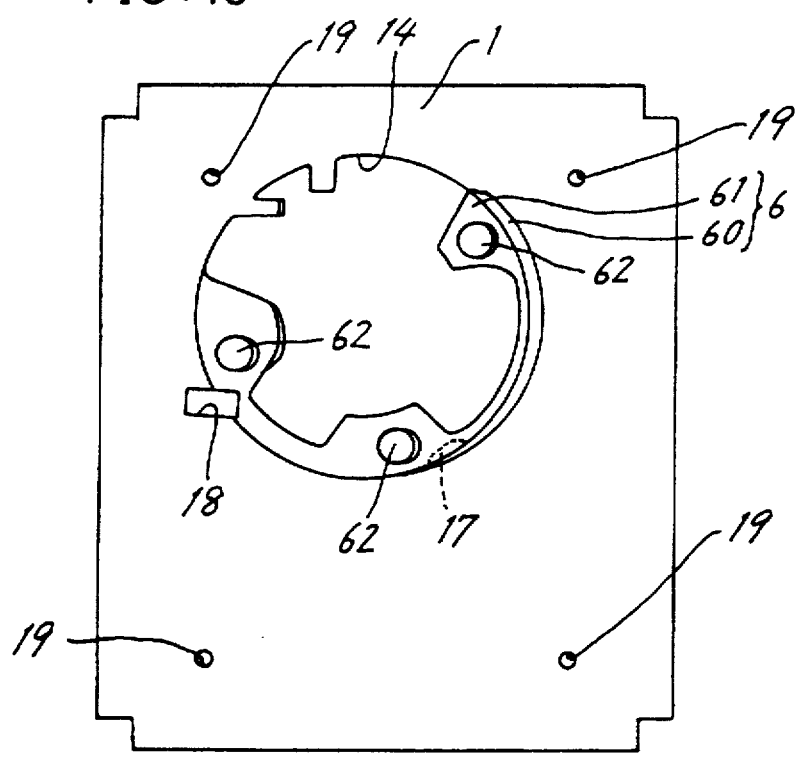
FIG. 18 is a plan view showing a chassis drawing step.

The mount 6 is formed by the following procedure. First as seen in FIG. 17, reference holes 19, 19, 19, 19 are formed in the chassis 1 for fixing the same during shaping, the chassis 1 is then fixed by fitting a jig to the reference holes, and the opening 14 and the relief holes 17, 18 are thereafter formed Next as shown in FIG. 18, the reinforcing wall 60 and the inclined portion 61 are shaped by a single press operation with the chassis 1 fixed to make the mount 6. The relief holes 17, 18 are formed so that the distortion resulting from the drawing work for shaping exerts no influence on the portions of the chassis 1 which require planarity. After the reinforcing wall 60 and the inclined portion 61 are formed, the inclined portion 61 is subjected to press work again to make the lugs 62.

Figure 15:
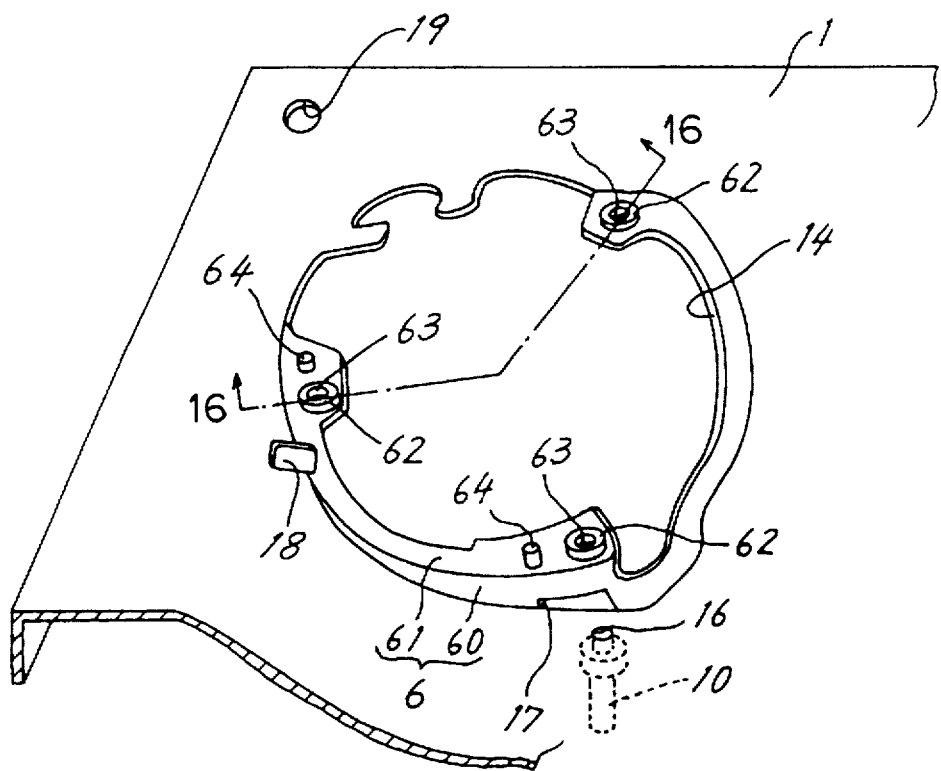
FIG. 15 is a perspective view of a mount.

Screw holes 63, 63, 63 are subsequently made in the respective lugs 62, 62, 62, and the positioning projections 64, 64 are formed as seen in FIG. 15. The crimp hole 16 is made in the chassis 1 in the vicinity of the relief hole 17. Finally, the four external side portions of the chassis 1 are bent downward. Incidentally, the first relief hole 17 is formed in the reinforcing wall 60 only but is not allowed to extend into the chassis 1 in order to obtain an area for providing the crimp hole 16.

The chassis 1 thus worked on by drawing is subjected to the known outsert molding operation (not shown) for causing the chassis to retain various parts for the travel of the tape. The pivot 10 is fixed in the hole 16 by crimping to complete the chassis 1.

Figure 16:
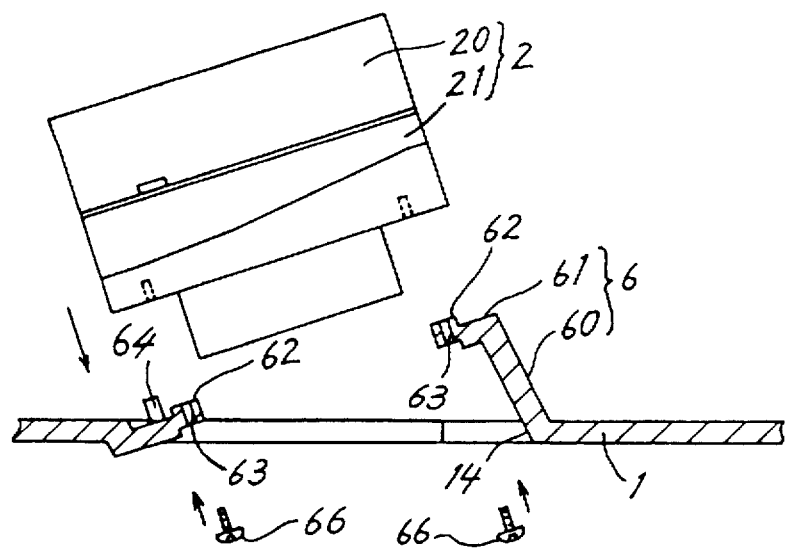
FIG. 16 is a view in section taken along the line A—A in FIG. 15.

The rotary cylinder 2 is mounted on the chassis 1 by placing the cylinder 2 on the lugs 62, 62, 62 of the inclined portion 61 first while fitting the cylinder 2 to the positioning projections 64, 64 as seen in FIG. 16, and thereafter driving screws 66, 66, 66 into the cylinder 2 through the screw holes 63, 63, 63.

In mounting the rotary cylinder 2 on the mount 6, the cylinder 2 is fitted to the positioning projections 64 and can therefore be positioned accurately relative to the inclined portion 61. This ensures normal recording and reproduction. The provision of the positioning projections 64 by drawing entails no increase in the number of components. The procedure for forming the mount 6 by drawing the chassis 1 is already disclosed in Examined Japanese Patent Publication HEI 4-12553 and the aforementioned Published Japanese Utility Model Registration SHO 64-2319. The present invention is novel in that the positioning projections 64 are formed by drawing.

Furthermore, the relief hole 17 extending from the boundary between the reinforcing wall 60 and the plane of chassis 1 toward the wall 60 serves to diminish distortion of the portion around the hole 17. This assures the pivot 10 of an improved degree of verticality, rendering the loading link 7 operable accurately.

Catcher

The catcher 3 is prepared from PPS resin or the like by injection molding. As previously stated, the holder 31 is spaced apart from the prop arms 4, 4 by a distance S and from the reinforcing bar 40 by a distance T (see FIG. 6), so that the catcher 3 can be molded by a die comprising upper and lower segments which are separate.

Figure 19:
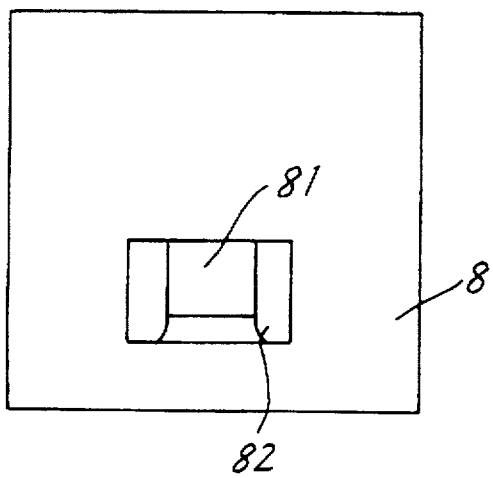
FIG. 19 is a plan view of a movable die member for molding the catcher.
Figure 20:
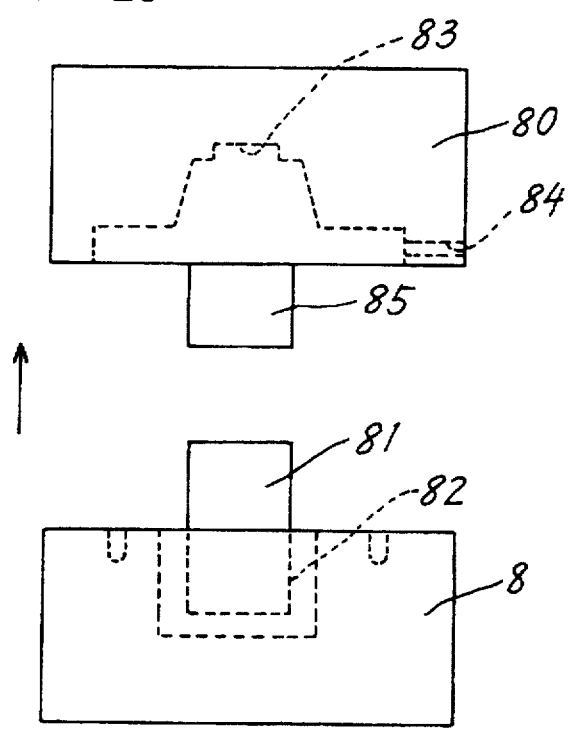
FIG. 20 is a front view of the movable die member and a fixed die member for molding the catcher.
Figure 21:
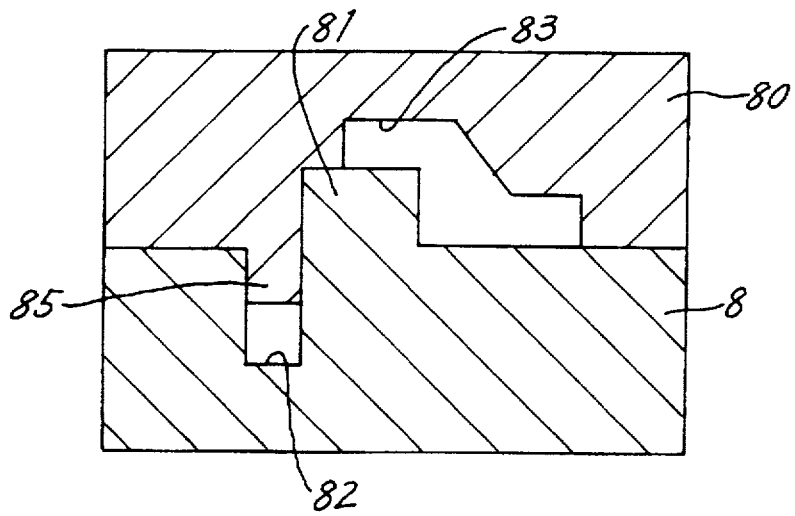
FIG. 21 is a view in longitudinal section of the movable die member and the fixed die member butting against each other.
Figure 22:
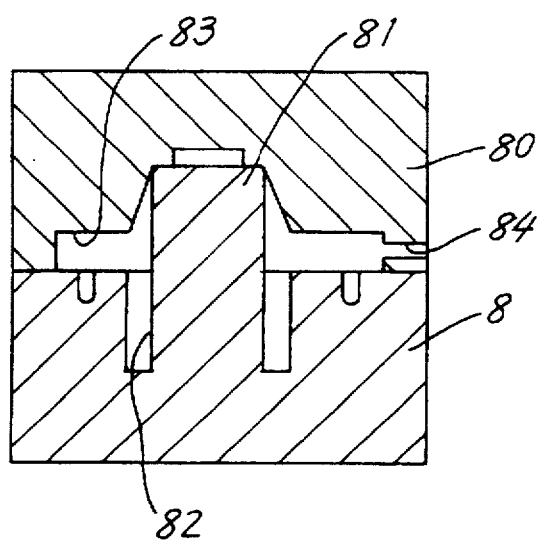
FIG. 22 is a cross sectional view of the same.

As is already known, the die comprises a fixed die member 80 and a movable die member 8. FIG. 19 is a plan view of the movable die member 8, FIG. 20 is a front view of the movable die member 8 and the fixed die member 80, and FIGS. 21 and 22 are respectively a longitudinal view and a cross sectional view showing the two die members 8, 80 butting against each other. Projecting upward from the movable die member 8 is a projecting element 81, around which a groove 82 is formed. The fixed die member 80 is formed with a bottom opening and a cavity 83 for the projecting element 81 to fit in. Molten resin poured in through an injection channel 84 fills up the space in the cavity 83 around the projecting element 81 to form the base 30 and the holder 31. The molten resin filling up the groove 82 makes the prop arms 4, 4 and the reinforcing bar 40. A piece 85 projecting from the fixed die member 80 has a lower end face which is positioned at the upper end of the portion of the groove 82 providing the reinforcing bar 40.

Figure 23:
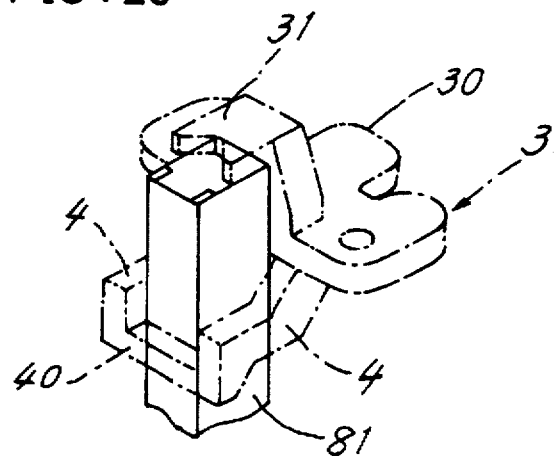
FIG. 23 is a perspective view showing the relationship between a projecting element of the movable die member and the catcher in position.

When seen from above, the holder 31 is so positioned that it has no portion lapping over the prop arms 4, 4 or bar 40. Accordingly, the projecting element 81 of the movable die member 8 is capable of passing through the space between the portions to be made into the prop arms 4, 4 to fit into the fixed die member 80 as shown in FIG. 23. When seen from above, the reinforcing bar 40 is spaced apart from the holder 31, so that the bar 40, if provided, will not interfere with the projecting element 81 when the die members are separated. Thus, the bar 40 can be formed by a die of the most basic construction.

Preventing Deflection of Stator Board of Rotary Cylinder

Figure 24:
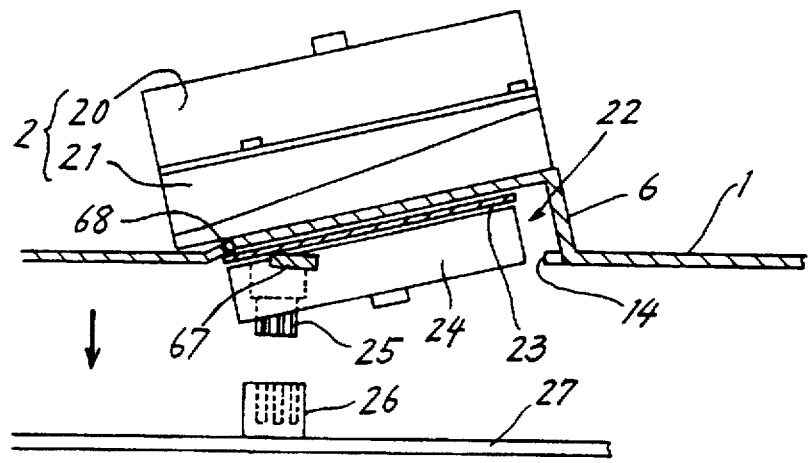
FIG. 24 is a view showing the chassis of FIG. 25 in section taken along the line B—B.

As an application of the mount 6, the present applicant has devised the arrangement shown in FIG. 24.

The rotary cylinder 2 in common use comprises a lower cylinder member 21 to be fixed onto the mount 6 and an upper cylinder member 20 rotatably mounted on the lower member 21, and is equipped with a motor unit 22 attached to the lower cylinder member 21 for drivingly rotating the upper cylinder member 20. The motor unit 22 comprises a stator board 23 having a socket 25, and a rotor 24 having an inner peripheral portion which is magnetized. Provided on the stator board 23 are a coil and conductor pattern (neither shown) for producing PG pulses and FG pulses by the rotation of the rotor 24. PG pulses are used for controlling the phase of rotation of the rotary cylinder 2, and FG pulses for controlling the speed of rotation of the cylinder 2. These pulses are currents induced by the rotation of the rotor 24. Disposed under the motor unit 22 is a circuit board 27 having a plug 26 fittable to the socket 25.

If the stator board 23 of the motor unit 22 deforms by deflection when the plug 26 is inserted into or removed from the socket 25, the distance between the stator board 23 and the rotor 24 alters, producing variations in the PG pulse and FG pulse outputs and giving rise to trouble in controlling the rotation of the upper cylinder member 20.

To prevent the deformation of the stator board 23, therefore, a support portion 67 and a retaining portion 68 are caused to project inward from the part defining the opening 14.

Figure 25:
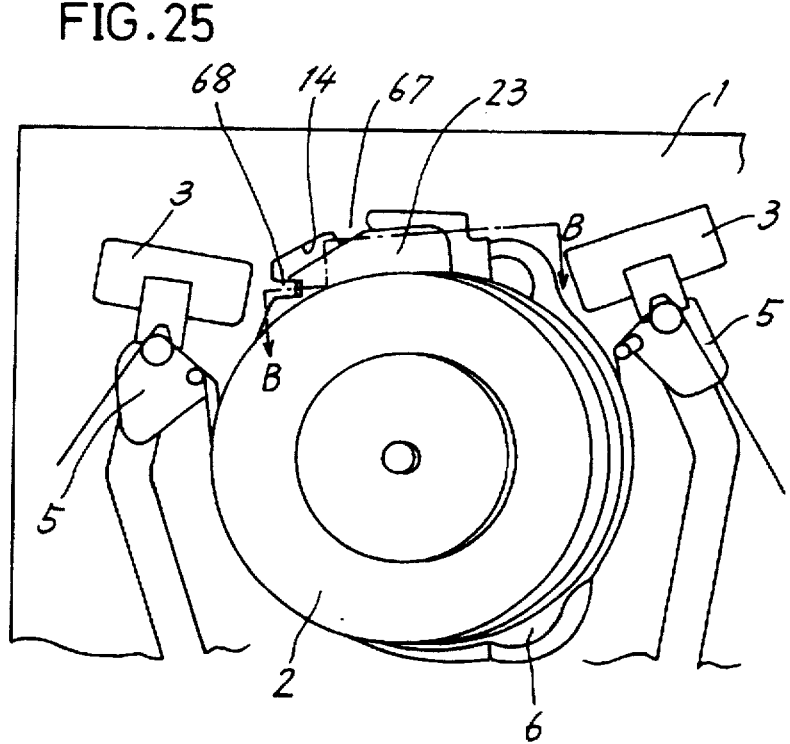
FIG. 25 is a plan view of the rotary cylinder with a motor unit attached thereto.
Figure 26:
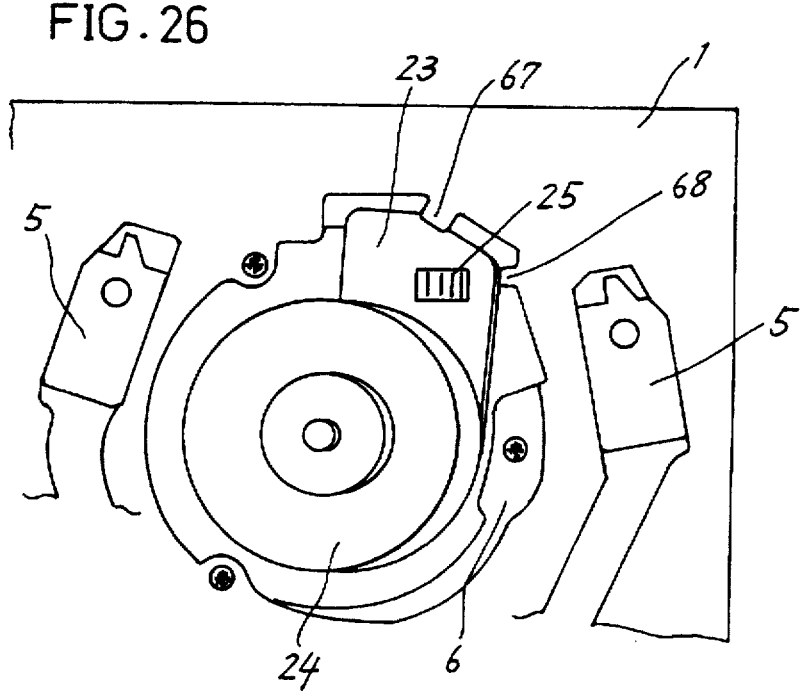
FIG. 26 is a bottom view showing the rotary cylinder of FIG. 25 as it is seen from the rear side.
Figure 27:
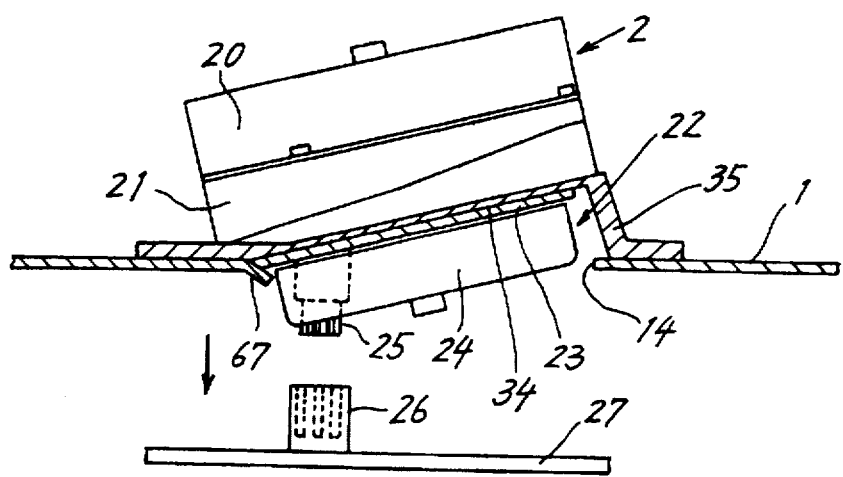
FIG. 27 is a view showing the chassis of FIG. 28 in section taken along the line C—C.
Figure 28:
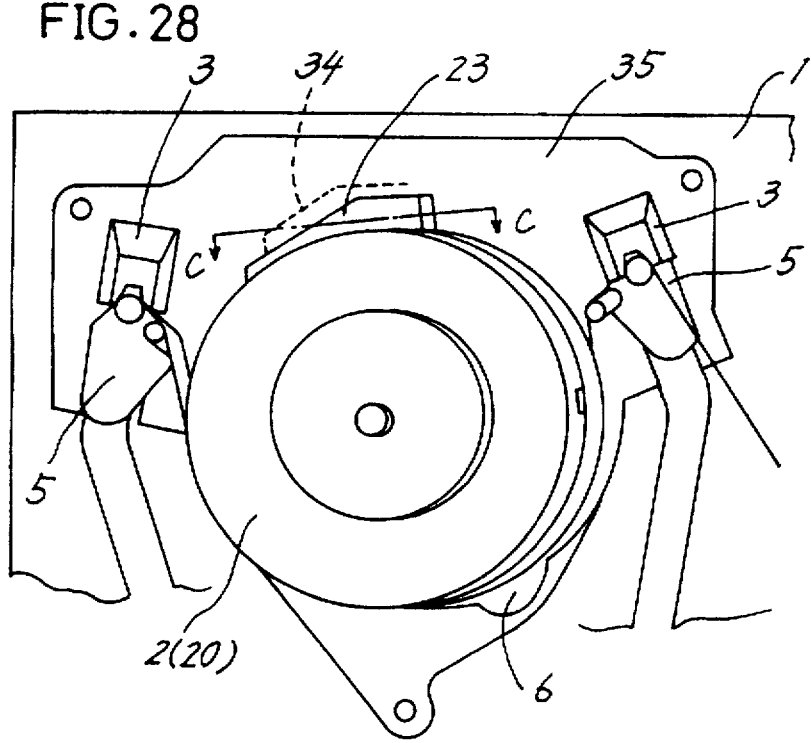
FIG. 28 is a plan view showing a cylinder base with the motor unit and the rotary cylinder attached thereto.
Figure 29:
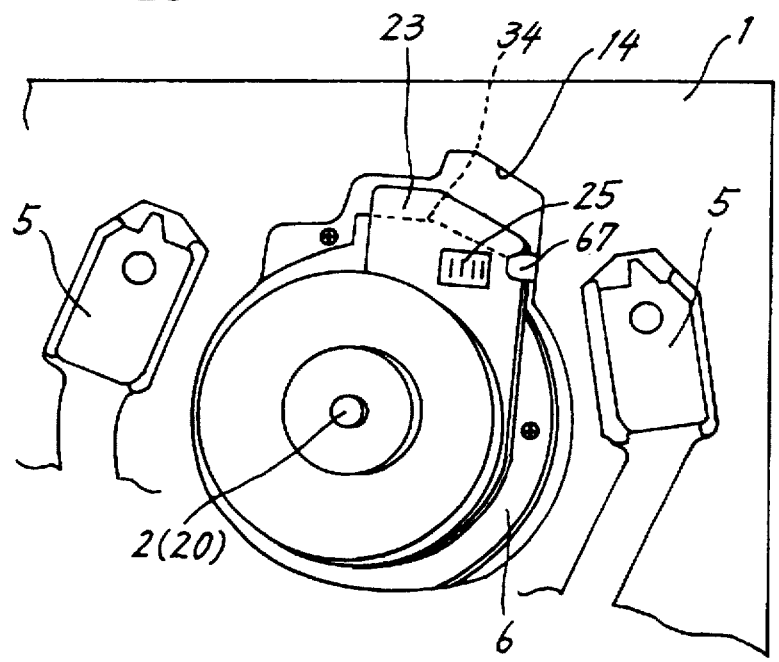
FIG. 29 is a bottom view showing the rotary cylinder of FIG. 28 as it is seen from the rear side.
Figure 30:
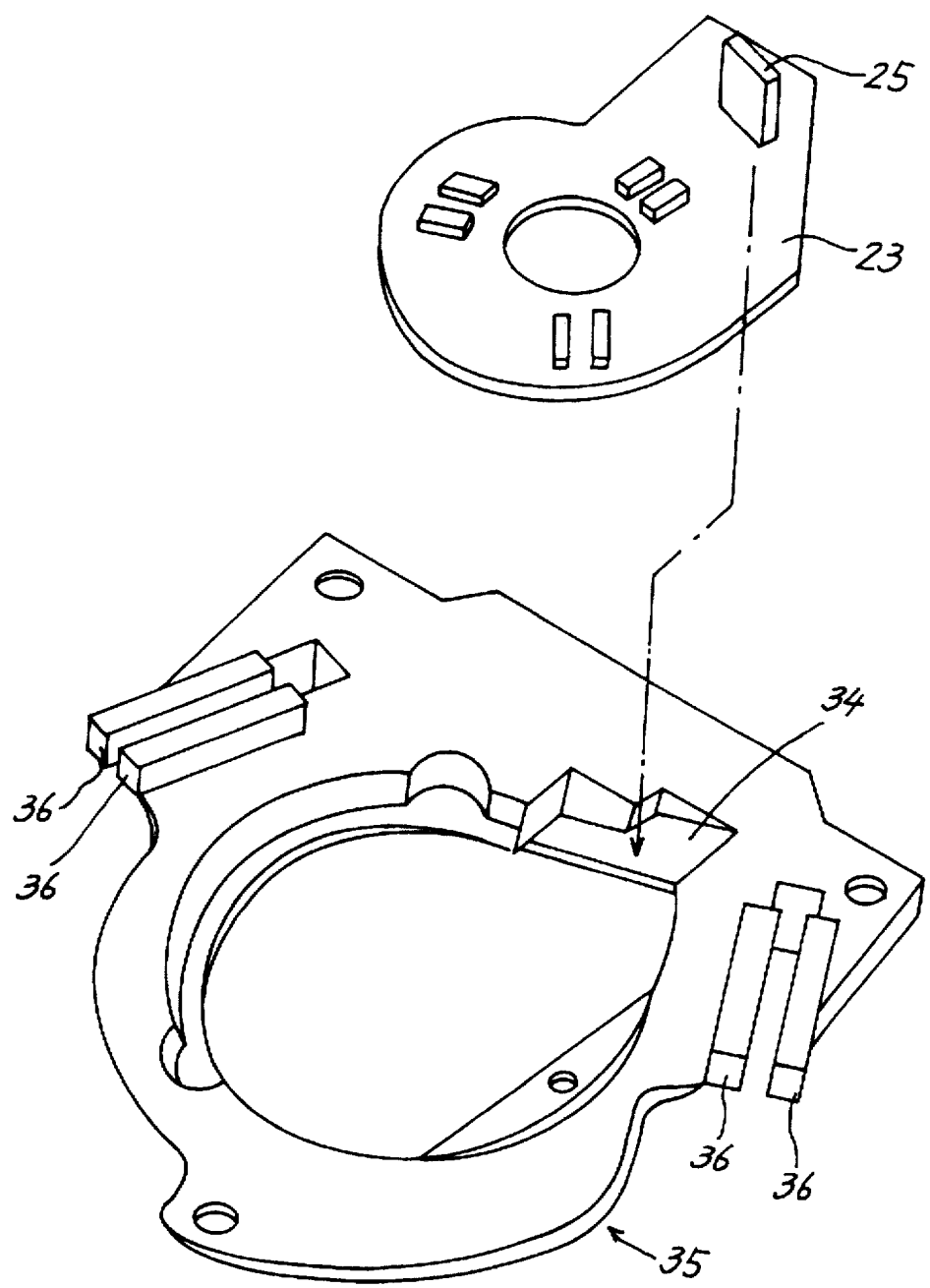
FIG. 30 is a perspective view showing a stator board as mounted on the rear side of the cylinder base.
Figure 32:
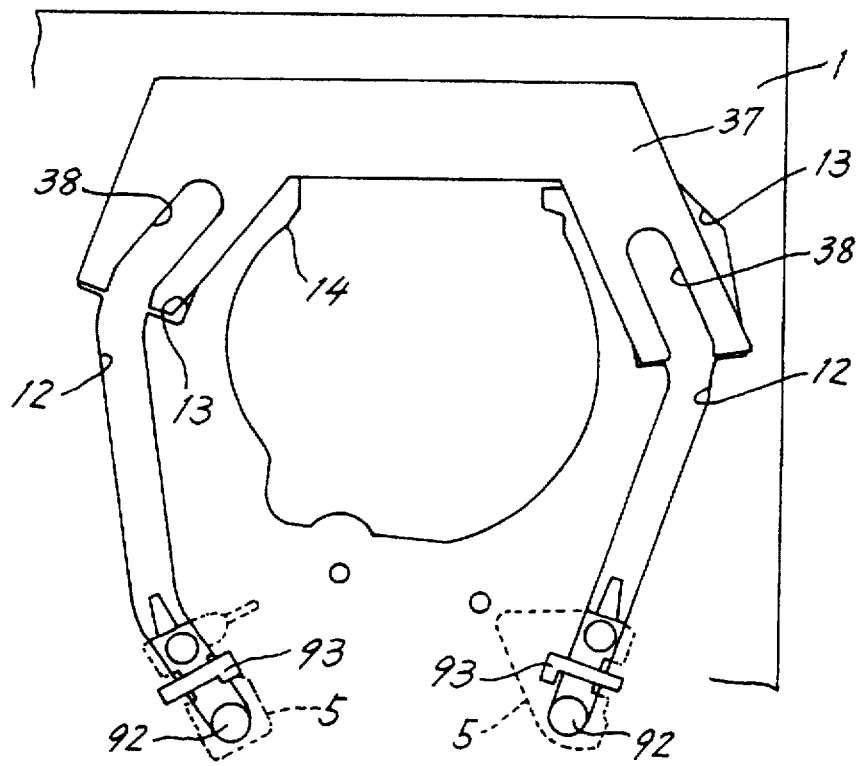
FIG. 32 is a plan view showing the conventional chassis as turned upside down and a jig as attached to the chassis.
Figure 33:
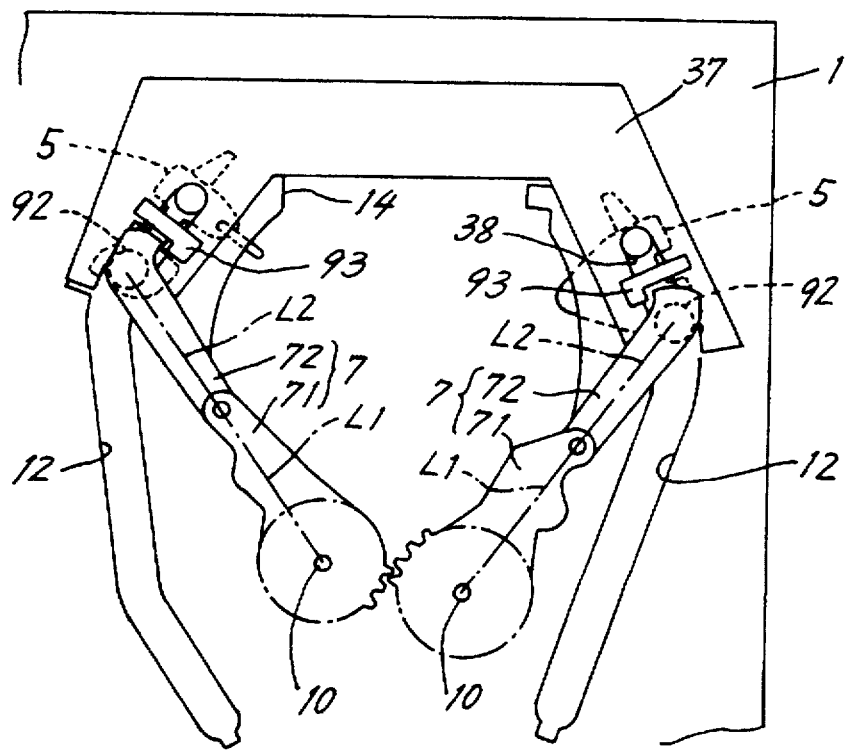
FIG. 33 is a plan view showing loading links attached to respective leading guide blocks fitted to the same chassis.
Figure 34:
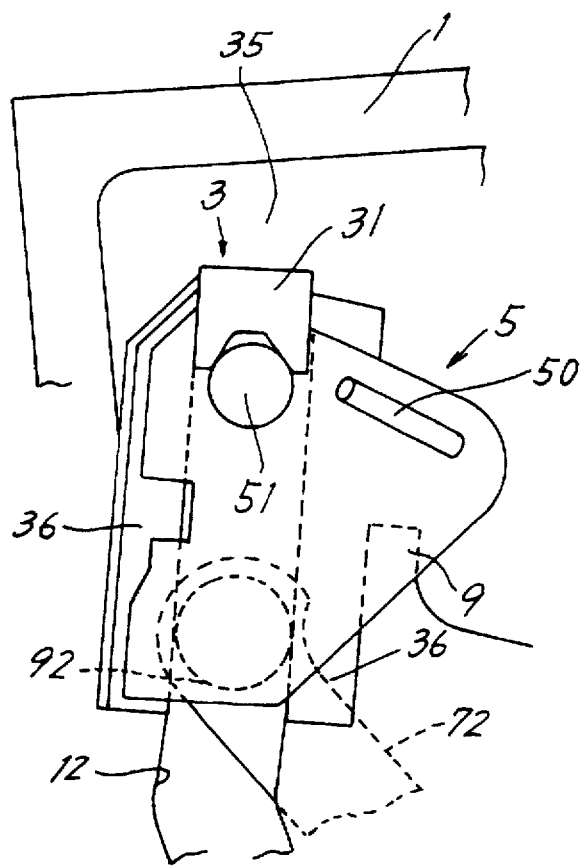
FIG. 34 is an enlarged plan view showing the guide block in pressing contact with a catcher.
Figure 35:
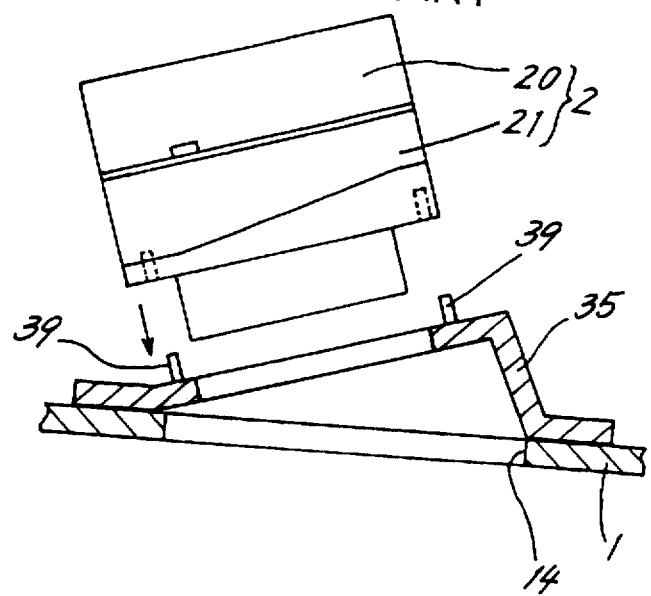
FIG. 35 is a plan view partly broken away and showing a rotary cylinder while it is being mounted on the conventional cylinder base.

Stated more specifically with reference to FIGS. 25 and 26, the support portion 67 is in contact with the bottom side of the stator board 23, and the retaining portion 68 with the upper side of thereof, with the rotary cylinder 2 placed on the mout 6. In this way, the stator board 23 is held between the two portions and thereby prevented from deforming by deflection.

In attaching the rotary cylinder 2 to the mount 6, an attempt may be made to place the cylinder onto the mount 6 from above, with the bottom of the lower cylinder portion 21 positioned to fit to the positioning projections 64, 64 on the mount 6, whereas the stator plate 23 is blocked by the retaining portion 68 and is not insertable.

Accordingly, the cylinder 2 is lowered as slightly rotated clockwise from the proper position of installation so as to avoid the interference of the retaining portion 68 with the stator board 23, and the statorboard 23 is thereafter placed in between the retaining portion 68 and the support portion 67 for mounting.

The applicant has also devised a structure for preventing the deflection of the stator board 23 with use of the conventional cylinder base 35 which is independent of the chassis 1 as shown in FIGS. 27 to 30. This structure has a support portion 67 projecting from the inner peripheral edge portion defining the opening 14 to which the mount 35 of the cylinder base 35 is fitted, the portion 67 serving to support the stator board 23 in contact with its bottom surface. The rear side of the cylinder base 35 is formed with a bearing face 34 opposed to the stator board 23 (see FIG. 30).

The rotary cylinder 2 and the motor unit 22 are attached to the cylinder base 35, which is then mounted on the chassis 1. The stator board 23 of the motor unit 22 is restrained from deflecting upward by the contact of the plate upper surface with the bearing face 34, with the plate lower surface in contact with the support portion 67.

As in the arrangement described, the bottom side of the stator board 23 has a socket 25, into which a plug 26 on the circuit board 27 is directly fittable. As in the foregoing arrangement, the support portion 67 and the bearing face 34 prevent the deflective deformation of the stator board 23 that would otherwise occur when the plug 26 is inserted into or removed from the socket 25, consequently eliminating variations in the PG pulse and FG pulse outputs.

The present invention is not limited to the construction of the foregoing embodiment but can be modified variously within the scope defined in the appended claims.

What is claimed is:

1. A tape loading mechanism comprising:

a pair of leading guide blocks slidably fitted in respective guide slots formed in a chassis for withdrawing a tape from a cassette;

loading links pivotally movable provided on the chassis for slidingly moving the respective guide blocks along the guide slots; and catchers mounted on the chassis at a loading completed position for the respective guide blocks to come into pressing contact therewith, each of the loading links including:

a pivotal lever having a base end rotatably supported by a pivot on the chassis; and a link plate connected by a pivot pin to a free end of the pivotal lever and rotatably engaged at a forward end portion thereof with a respective one of the guide blocks, the chassis being formed with apertures permitting insertion of the respective guide blocks therein, each of the apertures covered with each of the catchers and each of the apertures having a portion communicating with each of the guide slots, wherein when a first center line connecting the pivot on the chassis and the pivot pin on the pivotal lever and a second center line connecting the pivot pin and the portion of connection between the respective guide block and the respective link plate extend toward the loading completed position in alignment with each other, the respective portion of the aperture communicating with the respective guide slot is positioned at a greater distance from the pivot than the forward end portion of the link plate rotatable engaged with the guide block, and the portion of the catcher to be contacted by the guide block being provided by a portion of a holder disposed closer to a loading wait position than the portion of the aperture communicating with the guide slot.

2. A tape loading mechanism as recited in claim 1, wherein each of the leading guide blocks has a support plate slidable on the chassis, wherein each of the catchers has prop arms for a second shaft extending from the bottom side of each of the support plates to come into contact therewith, and further comprising positioning protrusions formed on the chassis, each of the positioning protrusions disposed in a path of movement of each of the support plates, each of the support plates being provided on a respective lateral side of the chassis with an abutting face to be opposed to the respective positioning protrusion, each of the guide blocks being restrained from rotatingly deflecting about the portion of contact between the respective guide block and the respective catcher within a plane parallel to the chassis by the contact of the respective abutting face with the respective positioning protrusion.

3. A tape loading mechanism as recited in claim 2, wherein the second shaft of each of the guide blocks is formed with a cutout portion recessed from a periphery part of the second shaft to be opposed to one of the prop arms opposite to the other prop arm to be contacted by the second shaft, and a clearance is formed between the cutout portion and the one of the prop arms to be opposed thereto upon the respective guide block reaching the loading completed position.

4. A tape loading mechanism as recited in claim 2, wherein each of the loading links fits to a boss projecting from the bottom side of each of the support plates, and wherein each of the support plates has a projection extending downward therefrom in the vicinity of the boss and positioned approximately in the center of width of the respective guide slot, each of the loading links being restrained from deflecting upward by the projection.

5. A tape loading mechanism as recited in claim 3 wherein each of the support plates has a boss projecting from the bottom side of the support plate and fitting to the respective loading link, and the boss is formed with a cutout at a periphery thereof for preventing the boss from contacting the portion of the chassis defining the respective guide slot upon the respective guide block coming into pressing contact with the respective catcher.

6. A tape loading mechanism as recited in claim 2, wherein the holder and the pair of prop arms of each of the catchers are integrally formed, wherein the prop arms of each of the catchers are approximately parallel to the direction of advance of the respective guide block and come into contact with the second shaft of the respective guide block to restrain the respective guide block from rotatingly deflecting within a plane perpendicular to the direction of advance of the respective guide block, and wherein each pair of the prop arms has a reinforcing bar interconnecting respective outer ends of each pair of the prop arms at a position closer to the loading wait position than the respective holder.

7. A tape loading mechanism with a chassis in which tape from a cassette is withdrawn, said tape loading mechanism comprising:

guide slots formed in the chassis;

apertures formed in the chassis, each of the apertures having a portion respectively communicating with the guide slots;

leading guide blocks respectively insertable in the apertures and slidably fitted in the guide slots guiding the tape when the tape is withdrawn from the cassette;

loading links provided on the chassis pivotably sliding the respective guide blocks along the guide slots, each of the loading links including:

a pivotal lever having a base end rotatably supported by a pivot on the chassis; and a link plate connected by a pivot pin to a free end of the pivotal lever and rotatably engaged respectively with one of the guide blocks at a forward end portion of the link plate, wherein a first center line connects the pivot on the chassis and the pivot pin on the pivotal lever and a second center line connects the pivot pin and the forward end of the link plate engaged with the respective guide block, and when the first center line and the second center line extend toward a loading completed position in alignment with each other, the respective portion of the aperture communicating with the respective guide slot is positioned at a greater distance from the pivot than the forward end portion of the link plate rotatable engaged with the guide block; and catchers mounted on the chassis covering the apertures at the loading completed position each having a holder with a portion with which the respective guide blocks come into pressing contact, the portion of the holder being disposed closer to a loading wait position than the portion of the aperture communicating with the guide slot.

* * * * *